United States Patent [19]
Kato

[11] Patent Number: 5,212,592
[45] Date of Patent: May 18, 1993

[54] ADJUSTED FOCUS HOLDING MECHANISM FOR BINOCULAR

[75] Inventor: Masashi Kato, Warabi, Japan

[73] Assignee: Kakakua Koki Kabushiki Kaisha, Warabi, Japan

[21] Appl. No.: 612,265

[22] Filed: Nov. 9, 1990

[30] Foreign Application Priority Data

Nov. 9, 1989 [JP] Japan .............................. 1-130645[U]

[51] Int. Cl.[5] .............................................. G02B 23/00
[52] U.S. Cl. ..................................... 359/410; 359/425
[58] Field of Search ............................... 350/545–556, 350/145–146; 359/407–418, 425–426, 480, 481, 702–706, 825, 826–830

[56] References Cited

U.S. PATENT DOCUMENTS

4,818,086  4/1989  Moore ................................. 350/552
4,867,533  9/1989  Akin, Jr. ............................. 350/552

Primary Examiner—Bruce Y. Arnold
Assistant Examiner—Thong Nguyen
Attorney, Agent, or Firm—Christensen, O'Connor, Johnson & Kindness

[57] ABSTRACT

An adjusted-focus holding mechanism for a binocular having a rotatable focus adjustment turning wheel (1), including an engageable locking member (2) provided between an immovable member (13) and the turning wheel. When in an initial position, the turning wheel is prevented from rotating by locking engagement with the engageable locking member. The turning wheel is reversibly movable from its initial position in a direction other than the direction in which the turning wheel is rotatable to disengage the engageable locking member and the turning wheel for focus adjustment.

9 Claims, 7 Drawing Sheets

ADJUSTED FOCUS HOLDING MECHANISM FOR BINOCULAR

FIELD OF THE INVENTION

The present invention relates to an adjusted-focus holding mechanism for a binocular and, more particularly, to a mechanism allowing the user of the binocular, if desired, to maintain the binocular in a focus-adjusted state for repeated telescopic watching and to rapidly adjust the focus to adapt for variation in watching distance and the user's visual adaptability.

BACKGROUND OF THE INVENTION

For an object which is substantially at a constant distance to be watched repeatedly once a focus adjustment has been made, it is desired to maintain the optical system of a binocular at this focus adjusted position. Various techniques for this purpose have already been proposed. It is known, for example, to lock a rotatable member, operatively associated with back and forth movement of the optical system along the optical axes, temporarily at an angular position corresponding to the adjusted focus by use of a click-stop mechanism. It is also known to preselect a plurality of watching distances, for example, short-, intermediate- and long-distances, and to hold the optical system temporarily at any one of focus adjusted points corresponding to those watching distances, respectively.

However, these well-known techniques have been inconvenient in that the reliability for holding the focus-adjusted state is relatively low, the focus-adjusted state to be held often changes during repeated watching, or the reliable holding effect is achieved only by unacceptably troublesome operation. Accordingly, it has been desirable to solve these drawbacks simultaneously.

SUMMARY OF THE INVENTION

It is an object of the present invention to provide a mechanism for reliably holding an optical system in a focus-adjusted state, corresponding to a distance to a desired object that is to be repeatedly watched, throughout the repeated watching by simplified operation, and to allow such holding effect to be rapidly cancelled in preparation for new focus adjustment.

The object set forth above is achieved, according to the present invention, by a focus-adjusted state holding mechanism used for a binocular. The mechanism includes a rotatable turning wheel that can be either locked against rotation or released for rotation from a focused position by moving the turning wheel in the direction other than the direction in which the turning wheel is rotatable. Such operation can be done with finger tips of one hand (normally the right hand) while the binocular is held in palm of the other hand (normally the left hand). In spite of the simplified operation, the mechanism provided by the invention assures highly improved reliability for holding of the focus adjustment so that no change in the focus-adjusted state occurs during the repeated watching and allows for refocusing and holding of this refocused state to be easily and rapidly performed. To this end, a drive mechanism used to move both sides of the optical system of the binocular back and forth along their respective optical axes includes the turning wheel and the axially movable shaft. An immovable locking member for locking the turning wheel is disposed between the turning wheel and the axially movable shaft so that the turning wheel is slidably movable with respect to the immovable locking member in the direction other than the direction in which the turning wheel is rotatable, i.e., movable along said axially movable shaft. Said turning wheel is engaged with or disengaged from said immovable locking member during the slidable movement thereof.

In further accordance with the invention, after the turning wheel has been moved axially from its initial position, the turning wheel may be rotated for a proper focusing and moved back to its initial position, once a desired focusing has been achieved, to lock the turning wheel against rotation and thereby to hold this focus-adjusted state. Specifically, the axial movement of the turning wheel causes the turning wheel to be disengaged from the immovable locking member and thereby to become rotatable, while reverse movement of the turning wheel back to its home position after focusing causes the turning wheel to be engaged again with the immovable locking member and thereby to be locked against rotation even when any external force acts on the wheel to cause rotation. Thus, any change in the focus-adjusted state is prevented throughout the repeated watching. Finally, a series of operations such as cancel and update of the focus-adjusted state and holding of a newly focus-adjusted state can be achieved merely by pinching the turning wheel between finger tips of one hand and moving this in the direction other than that in which the turning wheel is rotatable.

These and other features and advantages of the invention will be readily understood by those skilled in the art from the following description of two preferred embodiments as illustrated by way of example in the accompanying drawing.

BRIEF DESCRIPTION OF THE DRAWINGS

FIG. 1B is an enlarged partial axial cross section as in FIG. 1, showing insertion of a biasing spring;

DETAILED DESCRIPTION OF THE PREFERRED EMBODIMENT

Figure 1:
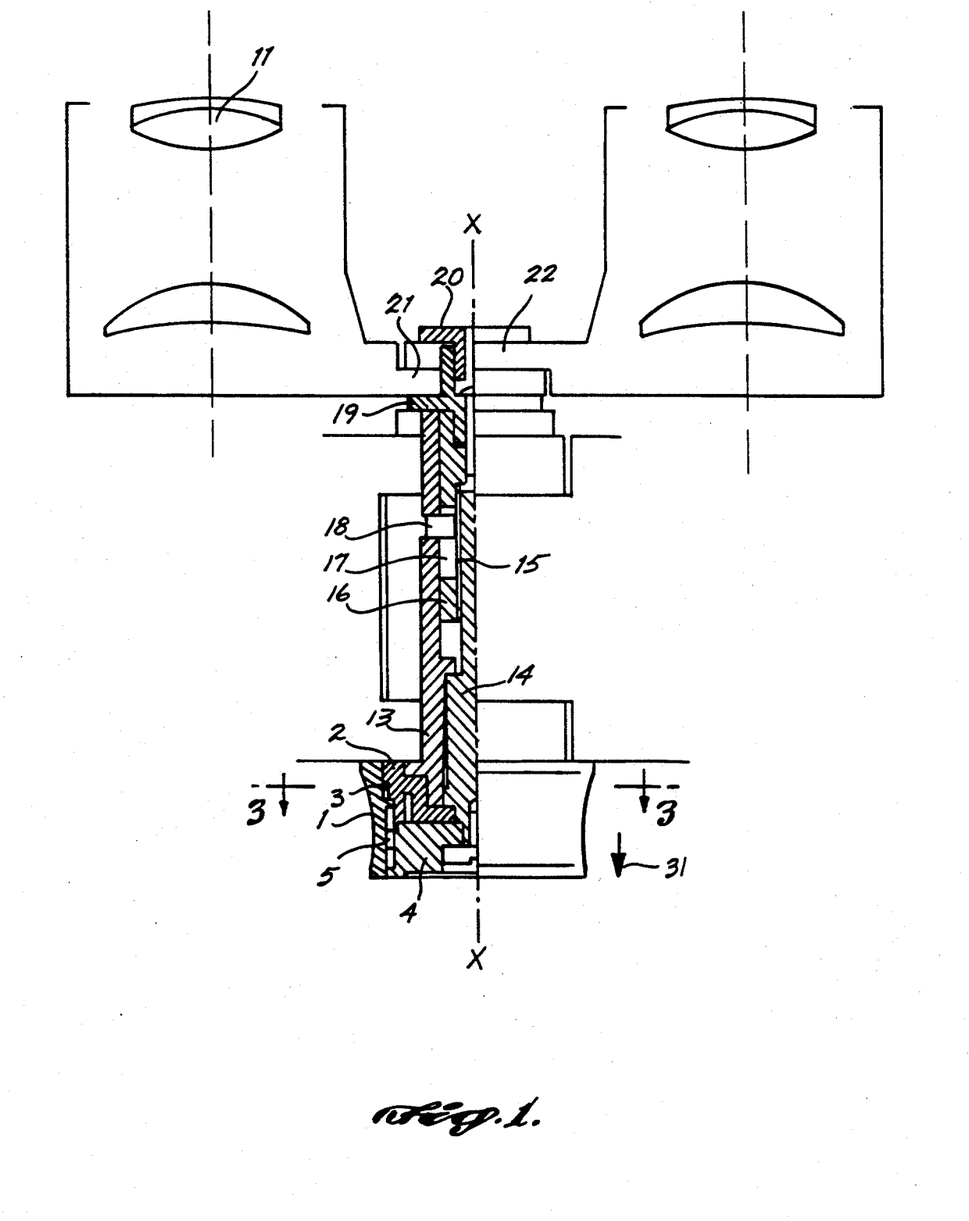
FIG. 1 shows a partial axial cross section of the principal components in a first preferred embodiment of a mechanism constructed in accordance with the present invention.

FIG. 1 illustrates principal components of a first preferred embodiment of the adjusted holding mechanism in a binocular as the binocular is held at a focus which has been adjusted.

With the exception of the focus-adjusted holding mechanism of the invention, the binocular is substantially similar to conventional binoculars with respect to its other principal components.

Referring to FIG. 1, reference numerals 11 and 12 designate left and right objectives, respectively, adapted to be moved back and forth along respective optical axes relative to respective eyepieces (not shown) for focusing. Reference numeral 13 designates an immovable tubular shaft around which a turning wheel 1 is rotatably mounted so that a rotation thereof is transmitted by an intermediary ring 4 to a rotary shaft 14 extending along an axis X—X. An axially movable tubular shaft 16 operatively associated by a helicoid 15 with the rotary shaft 14 is provided with a keyway 17 extending along a partial length of the shaft 16 so as to receive a guide pin 18 extending from the immovable tubular shaft 13 toward the axis X—X. The axially movable tubular shaft 16 is integrally provided on its forward end with a flanged cylindrical clamp 19 which is, in turn, provided with a cap screw 20 adapted to be coaxially threaded into the cylindrical clamp 19 to clamp respective supporting arms 21, 22 for the objectives 11, 12. The cap screw 20 threaded into the flanged cylindrical clamp 19 clamps the respective arms 21, 22 between the cap screw 20 and the flange of the cylindrical clamp 19 so that the respective arms 21, 22 may be rotated around the axis X—X after loosening the cap screw 20 for adjustment of a distance between the respective optical axes of the objectives 11, 12.

The rotary shaft 14 is rotated by the intermediary ring 4 as the wheel 1 is rotated and this rotation of the rotary shaft 14 is converted by the helicoid 15 to a linear movement of the axially movable tubular shaft 16. More specifically, the axially movable tubular shaft 16 is prevented by the guide pin 18 received in the keyway 17 from being rotated, but is movable back and forth along the axis X—X (in the vertical direction as viewed in the accompanying drawing). Such movement of the axially movable tubular shaft 16 causes the supporting arms 21, 22 to move the respective objectives 11, 12 back and forth substantially in the same manner as in the conventional binocular.

Figure 1A:
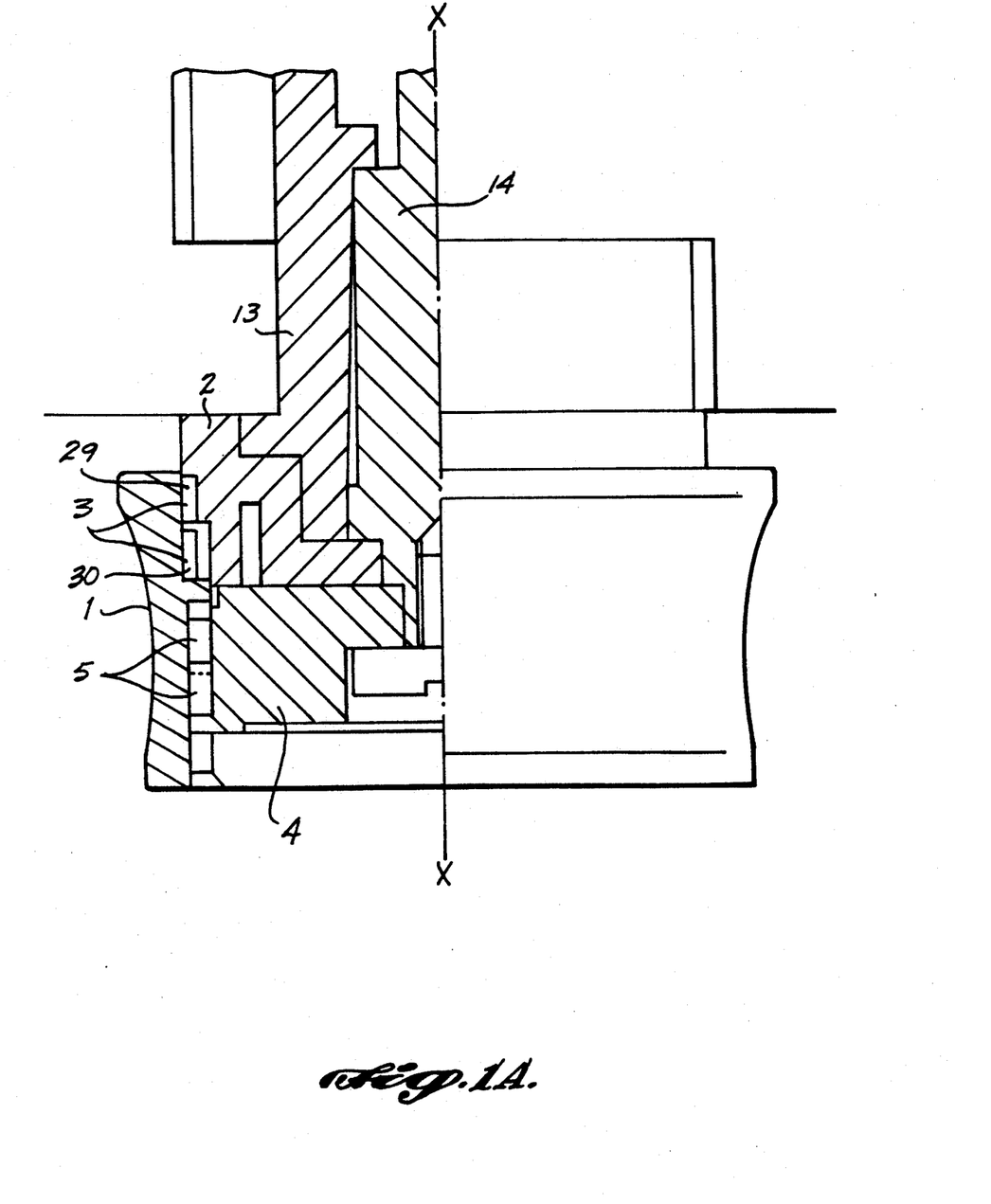
FIG. 1A shows in enlarged scale a portion of the view of FIG. 1, but having the focus adjusted mechanism turning wheel slidably moved from the adjusted-focus holding position to the focus readjustable position.

In accordance with the invention, there is provided between the immovable tubular shaft 13 and the turning wheel 1 a turning wheel locking ring 2 assembled integrally with the immovable tubular shaft 13. Referring to FIGS. 1 and 1A, an outer peripheral surface 29 of this ring 2 and an inner peripheral surface 30 of the turning wheel 1 are each partially formed to define a cooperating knurled surface 3 (shown in FIGS. 3) extending in a direction other than that in which the turning wheel 1 is rotatable, i.e., extending in the direction of the axis X—X, so that the turning wheel 1 can be slidably moved along the axis X—X. The intermediary ring 4 assembled integrally with the rotary shaft 14 includes gearing means 5 formed around its outer peripheral surface and adapted for engagement with associated gearing means 5 formed around the inner peripheral surface of the turning wheel 1. The gearing means 5 of the intermediary ring 4 and the turning wheel 1 provide for the turning wheel 1 to remain in engagement with the intermediary ring 4 during axial movement of the turning wheel, the ring 4 being rotated in operative association with the turning wheel 1. It will be readily understood that these cooperating gearing means 5 are defined by teeth-like irregularities oriented along the direction in which the turning wheel 1 is slidably moved.

Now operation of the mechanism constructed as has been mentioned above according to the invention will be discussed. Referring to FIG. 1A, sufficient movement of the turning wheel 1 relative to the turning wheel locking ring 2 in the direction as indicated by an arrow 31 in FIG. 1 cancels the lock effect having been effected by the engagement between the respective cooperating knurled surfaces 3. However, regardless of such slidable movement of the turning wheel 1, the turning wheel 1 and the intermediary ring 4 remain engaged with each other through their cooperative gearing means 5. Accordingly, rotation of the turning wheel 1 around the axis X—X from this state causes the intermediary ring 4 to rotate the rotary shaft 14. Rotation of the rotary shaft 14 in turn causes the axially movable tubular shaft 16, which is caused by the helicoid 15 to be linearly moved as constrained by engagement of the pin 18 in the keyway 17. As a result, the flanged cylindrical clamp 19 assembled integrally with said axially movable tubular shaft 16 cooperates with the cap screw 20 coaxially threaded therein to move the objectives 11, 12 supported by the respective arms 21, 22 back and forth (along the axis X—X).

In this state the user of the binocular is enabled to perform the operation of re-focusing for a desired object to be watched. After such focusing has been successfully made, the turning wheel 1 can be slidably moved back (in the reverse direction with respect to the arrow) to its initial position, with the turning wheel 1 being maintained in engagement with the intermediary ring 4 by the respective gearing means 5. As the turning wheel 1 is moved back to its initial position, the respective knurled surface 3 of the turning wheel and the locking ring 2 are brought back into engagement. Once the engagement has been restored between the respective knurled surfaces 3, it is no longer possible to rotate the turning wheel 1. Rotation of the turning wheel 1 in this position is prevented by the locking ring 2 due to the locking ring 2 being assembled integrally with the immovable tubular shaft 13. In this manner, the adjusted focus is reliably held.

Figure 2:
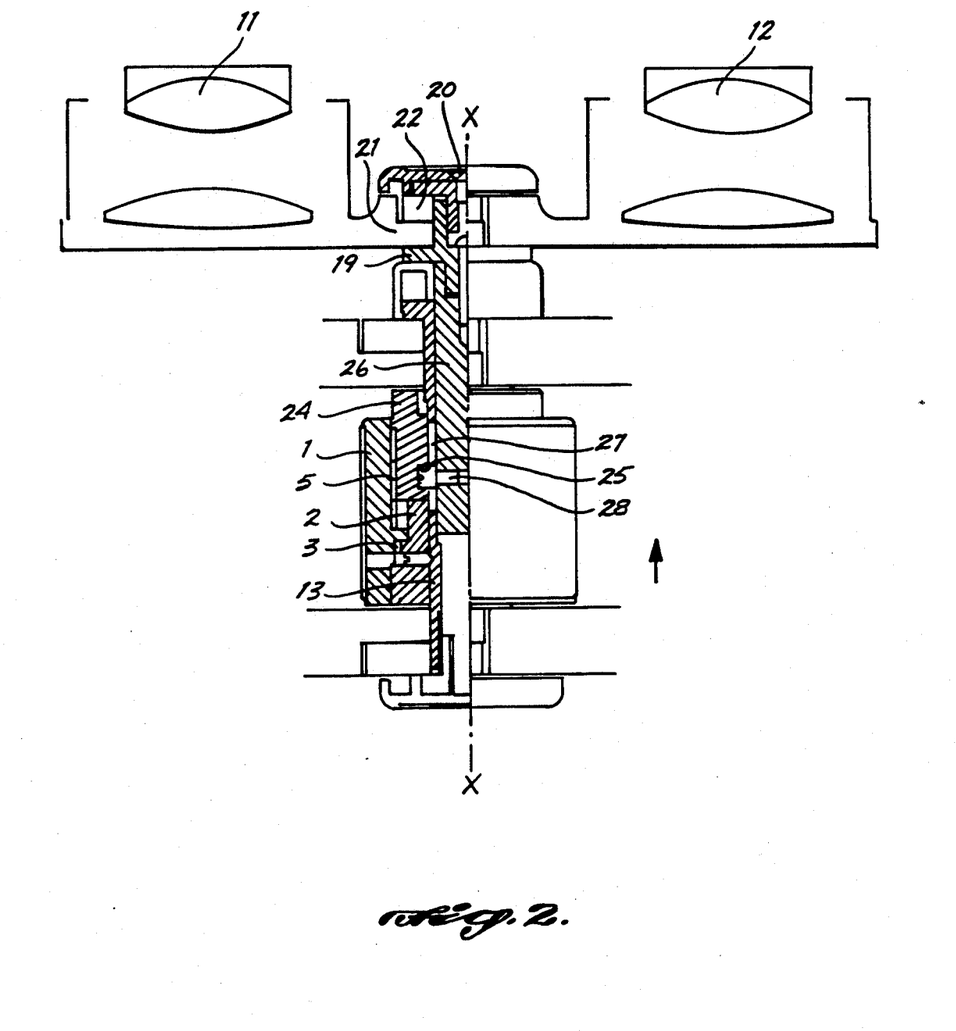
FIG. 2 shows a partial axial cross section of the principal components in a second preferred embodiment of a mechanism constructed in accordance with the present invention.

FIG. 2 illustrates another embodiment having a construction different from that of the embodiment illustrated by FIG. 1. It should be understood that the members of the embodiment shown in FIG. 2 that are similar in function to those illustrated in FIG. 1 are designated by similar reference numerals in order to facilitate comparison.

In the embodiment illustrated in FIG. 2, rotation of the turning wheel 1 around the immovable tubular shaft 13 causes the gearing means 5 to rotate a rotary tubular shaft 24. This rotary tubular shaft 24 has a helical cam groove 25 formed in its inner peripheral surface. The helical cam groove 25 is adapted for engagement with a guide screw 28 extending outwardly from a portion of an axially movable shaft 26 to transmit the rotation of the rotary tubular shaft 24 to the axially movable shaft 26. The immovable tubular shaft 13 is interposed between the rotary tubular shaft 24 and the axially movable tubular shaft 26 so as to surround the latter. The tubular shaft 13 is provided with a longitudinal split groove 27 extending along a partial length of the tubular shaft 13 so that the guide screw 28 extends through the split groove 27. Accordingly, rotation of the rotary tubular shaft 24 is converted by the guide screw 28 to a linear back and forth movement along the axis X—X, rather than a rotation, of the axially movable shaft 16, since transmission of rotation of the rotary tubular shaft 24 to the axially movable shaft 16 is controlled by the direction of the longitudinal split groove 27.

The helicoid, the guide pin and the keyway present in the embodiment illustrated by FIG. 1 are replaced by the cam groove, the guide screw and the longitudinal split groove, respectively, in the embodiment illustrated in FIG. 2 as the elements constituting the mechanism used to convert a rotational movement to a linear movement.

Figure 3:
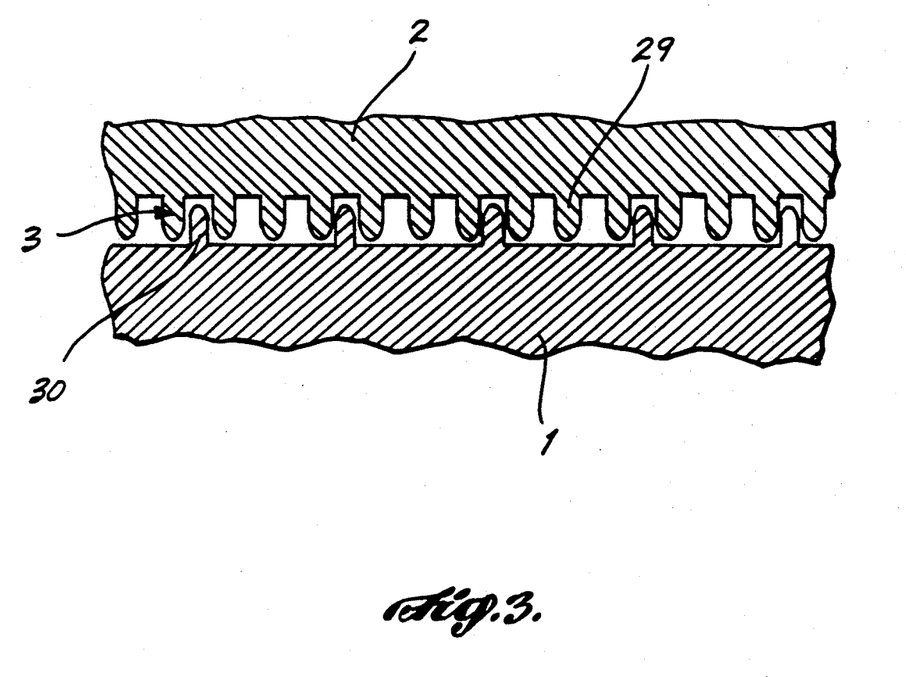
FIG. 3 shows a partial, developed plan cross section of the engaged knurled surfaces of the locking ring and turning wheel, taken substantially along line 3—3 of FIG. 1.

The inner peripheral surface of the turning wheel 1 is partially formed as a knurled surface 3 while the outer peripheral surface of the turning wheel locking ring 2, which is assembled integrally with the immovable tubular shaft 13, is also partially formed as a similar knurled surface 3 similar to the knurled surfaces 3 of the previous embodiment shown in FIG. 3. The turning wheel 1 is allowed to rotate when the knurled surfaces 3 are disengaged from each other and is prevented from rotating when the knurled surfaces 3 are engaged with each other. These knurled surfaces 3 also define grooves extending in the direction of the axis X—X and thereby allows the turning wheel 1 to be slidably moved only in the direction of the axis X—X.

The inner peripheral surface of the turning wheel 1 and the outer peripheral surface of the rotary tubular shaft 24 include respective gearing means 5 cooperating to maintain the turning wheel 1 and the rotary tubular shaft 24 in engagement with each other even during slidable movement of the turning wheel 1 in the direction of the axis X—X.

Figure 2A:
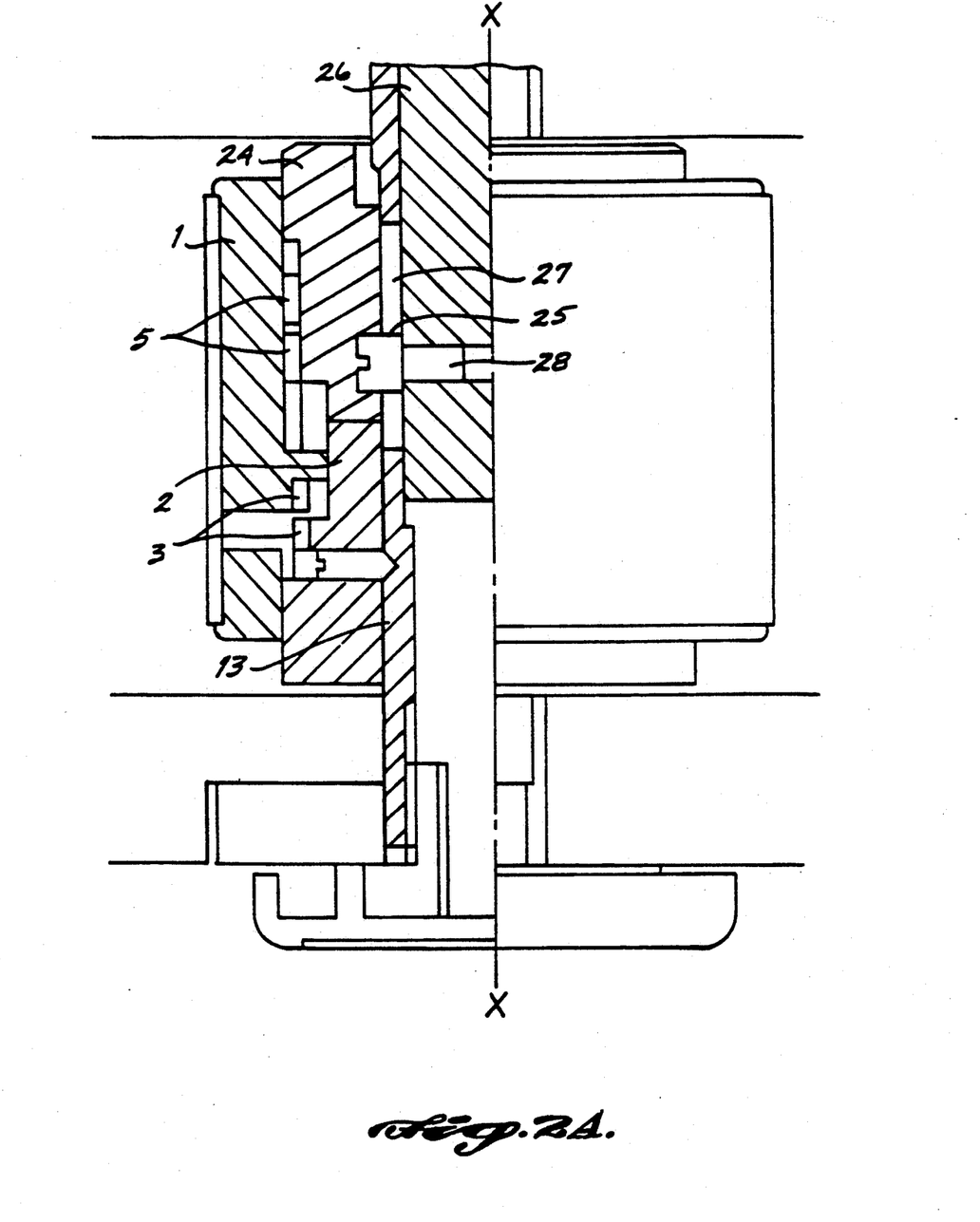
FIG. 2A shows in enlarged scale a portion of the view of FIG. 2, but having the focus adjusted mechanism turning wheel slidably moved from the adjusted-focus holding position to the focus readjustable position.

With this embodiment, the operation of focusing is performed by linearly moving the turning wheel 1 in the direction as indicated by an arrow in FIG. 2, and then rotating the turning wheel 1. Referring to FIG. 2A, linear movement of the turning wheel 1 in the direction as indicated by the arrow results in a cancelling of the engagement between the cooperating knurled surfaces 3 of the turning wheel 1 and the turning wheel locking ring 2. This sliding of the turning wheel 1 results in cancellation of the locking effect against rotation of the turning wheel 1, and the wheel 1 is brought into its rotatable state. However, even in this state, the turning wheel 1 and the rotary tubular shaft 24 are maintained in engagement with each other by the cooperating gearing means 5. As a consequence of this engagement, rotation of the turning wheel 1 causes the rotary tubular shaft 24 to be rotated. Rotation of the rotary tubular shaft 24 cause the guide screw 28, which is received in the cam groove 25 formed in the inner peripheral surface of the rotary tubular shaft 24, to be moved along the longitudinal split groove 27, resulting in a back and forth movement (in the direction of the axis X—X) of the axially movable shaft 26 in winch the guide screw 28 is provided. In this manner, the objectives 11, 12 supported by the respective arms 21, 22 are moved back and forth along their respective optical axes for a desired focusing operation.

After a desired focusing has been obtained for a particular object to be watched, the turning wheel 1 may be moved in the reverse direction with respect to the arrow shown in FIG. 2 to restore engagement between the cooperating knurled surfaces 3 of the turning wheel 1 and the locking ring 2. The turning wheel 1 is thereby prevented from rotating due to its engagement with the locking ring 2, which is integral with the immovable tubular shaft 13, and the adjusted focus state is maintained.

Figure 2B:
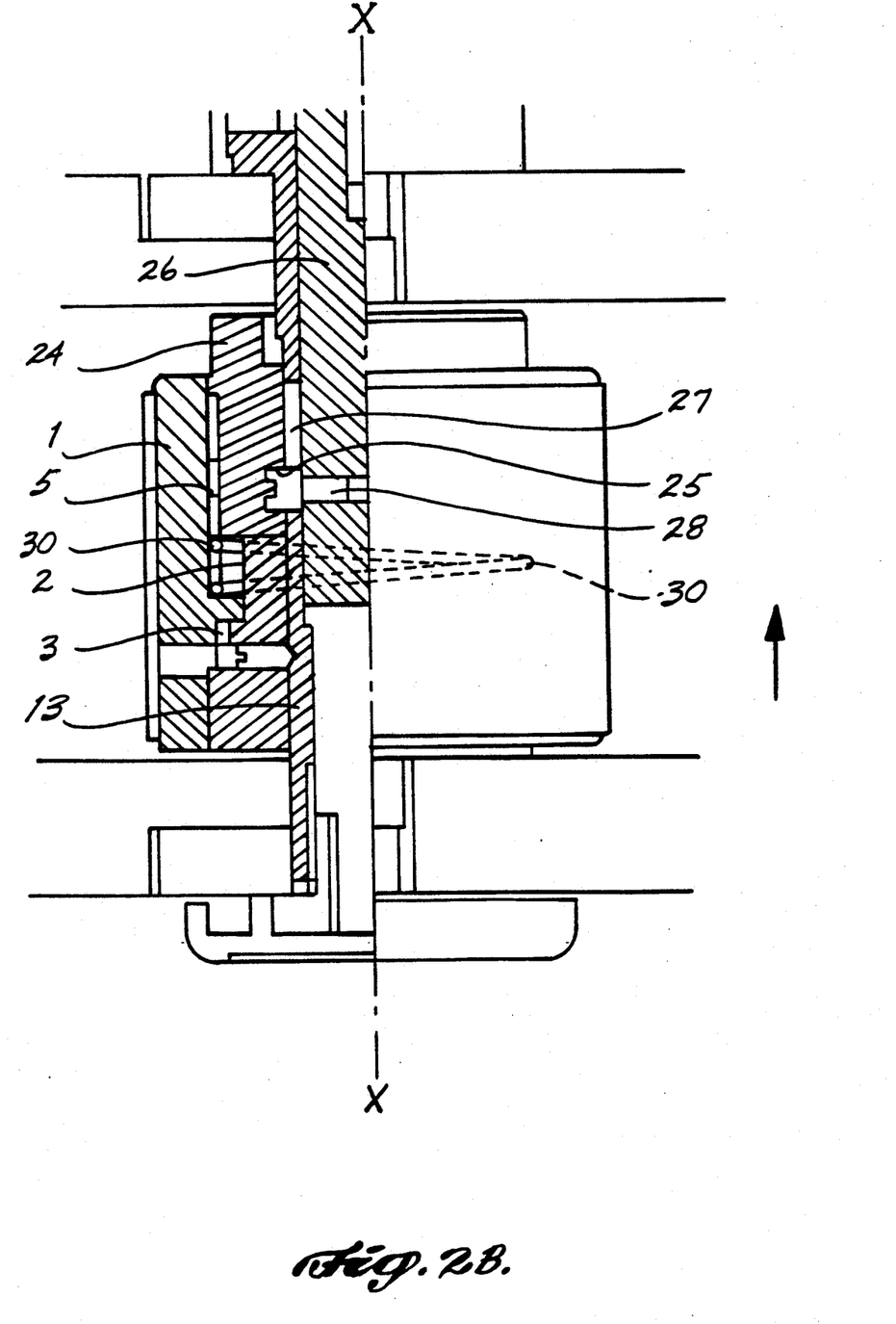
FIG. 2B shows an enlarged partial axial cross section as in FIG. 2, showing insertion of a coil spring.

Basically, both the first and second embodiments are constructed so that the turning wheel 1 may be moved in a direction other than that in which the turning wheel 1 is rotatable in order to allow an adjustable rotation thereof necessary for the operation of focusing. The turning wheel 1 may then be moved back to its initial position to prevent the turning wheel 1 from being rotated. It should be apparent that for further convenience to the user, a binocular constructed in accordance with the present invention can be configured so that the respective knurled surface 3 of the turning wheel 1 and the locking ring 2 can be automatically brought into engagement for locking of the turning wheel 1 against its rotation, rather than manually sliding the turning wheel 1 for this purpose. To this end, the turning wheel 1 may be loaded with suitable biasing means such as a coil spring 30, as shown in FIGS. 1B and 2B or a spring washer having a relative long stroke of compression.

While these embodiments have been described as adopting the focusing mechanism such that the objectives are moved along the respective optical axes relative to the associated eyepieces, the present invention is applicable also to a binocular employing the focusing mechanism adapted to move the eyepieces along the respective optical axes relative to their associated objectives.

As will be apparent from the foregoing description, the present invention provides the mechanism assuring that once a desired focusing has been achieved, such focused state can be reliably maintained even if an accidental force such as an external force is exerted on the turning wheel. Further, operation of only the turning wheel is required for both focus readjustment and maintaining a focus-adjusted state. This allows the mechanism to be easily operated with one hand which still provides a reliable holding of the adjusted focus.

The embodiments of the invention in which an exclusive property or privilege is claimed are defined as follows:

1. In a binocular having a turning wheel adapted to rotate a rotary shaft, and an axially movable member that is moved along an axis in parallel to the binocular's optical axes by rotation of the rotary shaft, thereby to move an optical system of the binocular along one of said optical axes for achievement of a desired focused condition, the improvement comprising:
  an adjusted-focus holding mechanism comprising an engageable locking member engageable with said turning wheel so that said turning wheel in an initial position is prevented from rotating by locking engagement with said engageable locking member, wherein said turning wheel is movable from its initial position to cancel the locking of said turning wheel, thereby allowing rotation of said turning wheel for adjustment of the optical system focus, this adjusted focus being holdable by moving the turning wheel in the reverse direction to its initial position to re-engage said turning wheel with said locking member to lock said turning wheel against rotation.

2. The adjusted-focus holding mechanism of claim 1, wherein said engageable locking member and said turning wheel each define an engagement surface, said engagement surfaces cooperatively engaging when said turning wheel is in its initial position and disengaging when said turning wheel is moved from its initial position.

3. The adjusted-focus holding mechanism of claim 2, wherein said engagement surfaces of said locking member and said turning wheel comprise knurled surfaces disposed to allow axial movement of said turning wheel from and to its initial position.

4. The adjusted-focus holding mechanism of claim 2, wherein said engageable locking member comprises a locking ring defining an outer peripheral surface that is partially formed to define an engagement surface; and
said turning wheel defines an inner peripheral surface that is partially formed to define a corresponding engagement surface.

5. The adjusted-focus holding mechanism of claim 4, further comprising engaging means for engaging said turning wheel with said rotary shaft to transmit rotation of said turning wheel to said rotary shaft for axial movement of said axially movable member, said engaging means maintaining engagement of said turning wheel with said rotary shaft while said turning wheel is in its initial position as well as when said turning wheel is moved from the initial position.

6. The adjusted-focus holding mechanism of claim 1, further comprising engaging means for engaging said turning wheel with said rotary shaft to transmit rotation of said turning wheel to said rotary shaft for axial movement of said axially movable member, said engaging means maintaining engagement of said turning wheel with said rotary shaft while said turning wheel is in its initial position as well as when said turning wheel is moved from the initial position.

7. The adjusted-focus holding mechanism of claim 1, further comprising biasing means for automatically moving said turning wheel to its initial position for engagement with said engageable locking member.

8. The adjusted-focus holding mechanism of claim 5, wherein the engaging means comprises:
an intermediate ring integrally assembled to said rotary shaft; and
cooperative gearing formed on an outer surface of said intermediate ring and an inner surface of said turning wheel.

9. The adjusted-focus holding mechanism of claim 6, wherein the engaging means comprises:
an intermediate ring integrally assembled to said rotary shaft; and
cooperative gearing formed on an outer surface of said intermediate ring and an inner surface of said turning wheel.

* * * * *

UNITED STATES PATENT AND TRADEMARK OFFICE
CERTIFICATE OF CORRECTION

PATENT NO. : 5,212,592

DATED : May 18, 1993

INVENTOR(S) : M. Kato

It is certified that error appears in the above-identified patent and that said Letters Patent is hereby corrected as shown below:

On title page, item [54] and column 1, line 1, "ADJUSTED FOCUS" should read --ADJUSTED-FOCUS--

Column 5, line 18, "surface 3" should read --surface 3,--

Signed and Sealed this

Twenty-second Day of February, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,212,592

DATED : May 18, 1993

INVENTOR(S) : M. Kato

It is certified that error appears in the above-indentified patent and that said Letters Patent is hereby corrected as shown below:

On the title page, item [73], "Kakakua Koki Kabushiki Kaisha" should read --Kamakura Koki Kabushiki Kaisha--.

Signed and Sealed this

First Day of October, 1996

Attest:

BRUCE LEHMAN

*Attesting Officer*   *Commissioner of Patents and Trademarks*